(12) United States Patent
Reus et al.

(10) Patent No.: US 10,979,290 B2
(45) Date of Patent: Apr. 13, 2021

(54) DISCOVERY AND MINING OF PERFORMANCE INFORMATION OF A DEVICE FOR ANTICIPATORILY SENDING UPDATES TO THE DEVICE

(71) Applicant: Microsoft Technology Licensing, LLC, Redmond, WA (US)

(72) Inventors: Edward Reus, Woodinville, WA (US); Mario Goertzel, Bellevue, WA (US); Scott Field, Redmond, WA (US); Michael Joseph Healy, Duvall, WA (US); Joseph Dadzie, Redmond, WA (US); David Kays, Redmond, WA (US); John Douceur, Bellevue, WA (US); Henricus Johannes Maria Meijer, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/383,741

(22) Filed: Dec. 19, 2016

(65) Prior Publication Data

US 2017/0099185 A1    Apr. 6, 2017

Related U.S. Application Data

(63) Continuation of application No. 13/329,121, filed on Dec. 16, 2011, now Pat. No. 9,531,588.

(51) Int. Cl.
*H04L 12/24*     (2006.01)
*H04L 29/08*     (2006.01)
(Continued)

(52) U.S. Cl.
CPC ...... *H04L 41/0813* (2013.01); *H04L 41/0823* (2013.01); *H04L 67/20* (2013.01);
(Continued)

(58) Field of Classification Search
None
See application file for complete search history.

(56) References Cited

U.S. PATENT DOCUMENTS 7,092,941 B1    8/2006    Campos
7,457,872 B2   11/2008    Aton et al.
(Continued)

FOREIGN PATENT DOCUMENTS

CN    101222371 A    7/2008
JP    2003271422 A   9/2003
(Continued)

OTHER PUBLICATIONS

"Search Report Issued in European Patent Application No. 12856837.5", dated Jul. 3, 2015, 5 Pages.
(Continued)

*Primary Examiner* — James A Edwards
(74) *Attorney, Agent, or Firm* — Wade IP Law PLLC

(57) ABSTRACT

The subject disclosure relates to techniques for monitoring contextual and performance information of a device for anticipatorily sending update information to the device. An interface component can receive, from the client, contextual information indicating an operating environment of the client and performance information that is associated with one or more operations being performed by the client based on the operating environment, and send, based on correlation information, update information to the client. Further, a service component can to infer a relationship between the contextual information and the performance information to obtain the correlation information. In other embodiments, a client can populate a cache with portion(s) of the contextual information to obtain cached information, and send at least a portion of the cached information to a system including one or more aspects of the service component.

20 Claims, 11 Drawing Sheets

(51) Int. Cl.
   *G06F 15/17*     (2006.01)
   *H04L 12/26*     (2006.01)
(52) U.S. Cl.
   CPC ............ *H04L 67/22* (2013.01); *H04L 67/303* (2013.01); *H04L 67/306* (2013.01); *H04L 67/34* (2013.01); *G06F 15/17* (2013.01); *H04L 43/08* (2013.01)

(56) References Cited

U.S. PATENT DOCUMENTS

| | | | |
|---|---|---|---|
| 7,509,337 | B2 | 3/2009 | Chitgupakar et al. |
| 7,539,631 | B1* | 5/2009 | El-Haj .................. G06Q 30/06 705/26.1 |
| 7,827,122 | B1 | 11/2010 | Campbell et al. |
| 7,921,068 | B2 | 4/2011 | Guyon et al. |
| 8,572,219 | B1 | 10/2013 | Shigapov |
| 8,677,262 | B2* | 3/2014 | Baier ................ G05B 19/0426 715/772 |
| 2002/0152305 | A1* | 10/2002 | Jackson ............. H04L 41/5035 709/224 |
| 2002/0198991 | A1 | 12/2002 | Gopalakrishnan et al. |
| 2003/0041130 | A1* | 2/2003 | Harrisville-Wolff ........................ H04L 29/06 709/221 |
| 2003/0191733 | A1 | 10/2003 | Kiick et al. |
| 2005/0027659 | A1 | 2/2005 | Kumar et al. |
| 2005/0086364 | A1* | 4/2005 | Muti ....................... H04L 29/06 709/235 |
| 2005/0216600 | A1 | 9/2005 | Maron |
| 2006/0020937 | A1 | 1/2006 | Schaefer |
| 2006/0041936 | A1 | 2/2006 | Anderson et al. |
| 2006/0156086 | A1 | 7/2006 | Flynn et al. |
| 2006/0230058 | A1* | 10/2006 | Morris ................. G06Q 10/063 |
| 2006/0259809 | A1 | 11/2006 | Mishra et al. |
| 2007/0005320 | A1* | 1/2007 | Vinberg .................. G06F 30/00 703/13 |
| 2007/0088681 | A1* | 4/2007 | Aravamudan ....... G06F 17/3056 |
| 2007/0143851 | A1 | 6/2007 | Nicodemus et al. |
| 2007/0168498 | A1 | 7/2007 | Lambert et al. |
| 2007/0294387 | A1 | 12/2007 | Martin |
| 2008/0004841 | A1 | 1/2008 | Nakamura |
| 2008/0172348 | A1 | 7/2008 | Tien et al. |
| 2009/0138415 | A1* | 5/2009 | Lancaster ................ G06N 5/04 706/11 |
| 2009/0161554 | A1 | 6/2009 | Agarwal et al. |
| 2009/0168867 | A1* | 7/2009 | Verbrugge ....... H04N 21/23608 375/240.01 |
| 2009/0222399 | A1 | 9/2009 | Gomez et al. |
| 2009/0276539 | A1 | 11/2009 | Huerta et al. |
| 2010/0070965 | A1 | 3/2010 | Britten et al. |
| 2010/0095021 | A1 | 4/2010 | Samuels et al. |
| 2010/0192196 | A1 | 7/2010 | Lee |
| 2010/0198757 | A1* | 8/2010 | Cheng .................... G06Q 10/10 706/12 |
| 2010/0223341 | A1 | 9/2010 | Manolescu et al. |
| 2010/0229187 | A1 | 9/2010 | Marwah et al. |
| 2011/0145640 | A1 | 6/2011 | Hooks |
| 2011/0225142 | A1 | 9/2011 | McDonald |
| 2011/0275364 | A1* | 11/2011 | Austin .................... H04L 41/06 455/423 |
| 2011/0276956 | A1 | 11/2011 | Yuki |
| 2011/0307600 | A1 | 12/2011 | Polley et al. |
| 2012/0005480 | A1 | 1/2012 | Batke et al. |
| 2012/0016948 | A1* | 1/2012 | Sinha ..................... G06Q 10/10 709/207 |
| 2012/0041918 | A1* | 2/2012 | Yu ..................... G06F 17/30864 706/50 |
| 2012/0054544 | A1* | 3/2012 | Floyd .................. G06F 11/2043 714/6.32 |
| 2012/0096092 | A1* | 4/2012 | Davidge ............. H04L 65/4084 709/206 |
| 2012/0259978 | A1* | 10/2012 | Petersen ................ G06Q 50/22 709/224 |
| 2013/0111497 | A1 | 5/2013 | Chen et al. |

FOREIGN PATENT DOCUMENTS

| | | |
|---|---|---|
| JP | 2005327261 A | 11/2005 |
| JP | 2008009842 A | 1/2008 |
| JP | 2008123195 A | 5/2008 |
| JP | 2008171235 A | 7/2008 |
| JP | 2010186279 A | 8/2010 |
| JP | 2011238007 A | 11/2011 |

OTHER PUBLICATIONS

"Final Office Action Issued in U.S. Appl. No. 13/329,121", dated Dec. 17, 2013, 20 Pages.
"Final Office Action Issued in U.S. Appl. No. 13/329,121", dated Feb. 26, 2015, 28 Pages.
"Final Office Action Issued in U.S. Appl. No. 13/329,121", dated May 5, 2016, 32 Pages.
"Non Final Office Action Issued in U.S. Appl. No. 13/329,121", dated Nov. 19, 2015, 28 Pages.
"Non Final Office Action Issued in U.S. Appl. No. 13/329,121", dated Oct. 8, 2014, 23 Pages.
"Non Final Office Action Issued in U.S. Appl. No. 13/329,121", dated Jun. 10, 2013, 16 Pages.
"Notice of Allowance Issued in U.S. Appl. No. 13/329,121", dated Aug. 18, 2016, 7 Pages.
"Notice of Allowance Issued in Chinese Patent Application No. 201210546704.X", dated Mar. 8, 2016, 4 Pages.
"Office Action Issued in Chinese Patent Application No. 201210546704.X", dated Mar. 25, 2015, 12 Pages.
"Second Office Action Issued in Chinese Patent Application No. 201210546704.X", dated Nov. 23, 2015, 6 Pages.
Hassan, Ahmed E., "The Road Ahead for Mining Software Repositories", In Proceedings of Frontiers of Software Maintenance, Sep. 28, 2008, 10 Pages.
"International Search Report and Written Opinion Issued in PCT Application No. PCT/US2012/068324", dated Mar. 29, 2013, 9 Pages.
Rao, Sreenivasa Vuda, "Multi Agent-based Distributed Data Mining: An Overview", In Proceedings of International Journal of Reviews in Computing, Sep. 28, 2008, 10 Pages.
"Office Action Issued in Japanese Patent Application No. 2014-547302", dated Dec. 2, 2016, 10 Pages.
"Notice of Allowance Issued in Japanese Patent Application No. 2014-547302", dated Mar. 22, 2017, 3 Pages. (W/o English Translation).
"Office Action Issued in European Patent Application No. 12856837.5", dated Jan. 3, 2019, 7 Pages.
"Office Action Issued in Korean Patent Application No. 10-2014-7016129", dated Nov. 21, 2018, 7 Pages.

* cited by examiner

DISCOVERY AND MINING OF PERFORMANCE INFORMATION OF A DEVICE FOR ANTICIPATORILY SENDING UPDATES TO THE DEVICE

CROSS-REFERENCE TO RELATED APPLICATION(S)

This application is a continuation of U.S. patent application Ser. No. 13/329,121, entitled "DISCOVERY AND MINING OF PERFORMANCE INFORMATION OF A DEVICE FOR ANTICIPATORILY SENDING UPDATES TO THE DEVICE," filed Dec. 16, 2011, which is incorporated herein by reference in its entirety.

TECHNICAL FIELD

The subject disclosure generally relates to discovery and mining of performance information of a device for anticipatorily sending updates to the device.

BACKGROUND

Conventional computing technologies collect information associated with unresponsive or improperly functioning software operating on a computing device. For example, crash-reporting technology collects post-error debug information of an application that has crashed or stopped responding on the computing device. Further, such technology can analyze such information and send available solutions to a user of the device.

In another example, conventional computing technologies provide information to a user indicating available updates to application(s) installed on the user's computing device. Then, such technologies prompt the user to install the available updates.

However, conventional computing technologies reduce a user's experience(s) associated with a computing device, among other deficiencies, by delaying communication of information indicating updates associated with hardware and/or software of the computing device, and/or by requiring additional effort or understanding on the part of the user.

The above-described deficiencies of today's techniques are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In accordance with one or more embodiments and corresponding disclosure, various non-limiting aspects are described in connection with monitoring contextual and performance information of a device for anticipatorily sending update information to the device.

For instance, an embodiment includes receiving, by a service component (e.g., a network-based service including any form, or combination, of wired service, wireless service, such as a cloud-based service, device service or component service, such as a thumbdrive service), which is associated with a first computing device, e.g., a server, contextual information indicating portion(s) of an operating environment of a second computing device, e.g., a client of the network-based service, receiving user preference information, or receiving information about inferred future activity, current activity, or past activity of the user. In one example, the contextual information can include a configuration of hardware, e.g., central processing unit (CPU), memory, disk storage, etc. and/or software, e.g., application(s), operating system (OS), etc. of the second computing device, a location of the second computing device, a configuration of a network, a service, etc. that is communicatively coupled to the second computing device, etc. Accordingly, any of contextual information, user preference or user activity can be a basis for communication of configuration information.

Further, the embodiment includes receiving performance information that is associated with one or more operations being performed by the second computing device in the operating environment. For example, the performance information can indicate: a consumption of memory that is associated with an operating system of the second computing device, software of the second computing device, firmware of the second computing device, etc., input/output (I/O) bandwidth that is associated with execution of the operating system, the software, the firmware, etc., bandwidth of the network, latency that is associated with processing data via the network, etc.

Then, in response to correlating the contextual information with the performance information, configuration (or update) information is communicated to the second computing device. For example, the configuration information can include a recommendation, an offer, etc. to upgrade, update, not upgrade, not update, etc. the operating system, the software, the firmware, and/or hardware of the second computing device. In another example, the configuration information can include a recommendation to utilize a network, a communication protocol, etc.

In an embodiment, the correlating the contextual information with the performance information further includes inferring causation of a portion of the performance information from a portion of the contextual information. In another embodiment, the correlating further includes receiving other information (1) indicating a configuration of hardware and/or software of a third computing device and/or (2) indicating performance of the third computing device, and determining the configuration information based on the other information.

In yet another embodiment, the correlating further includes determining causation of a portion of the performance information from a portion of the contextual information, and communicating a portion of the configuration information to a third computing device, e.g., a system that is associated with receiving information regarding operation of the hardware and/or the software.

In one embodiment, the correlating further includes receiving other information that is associated with communication(s), e.g., queries, searches, etc. performed, e.g., by third parties, about hardware and/or software issue(s) associated with the contextual information and/or the performance information, and determining causation of a portion of the performance information from a portion of the contextual information based on the other information that is associated with the communication(s).

In one non-limiting implementation, an interface component can receive, from a client, contextual information indicating an operating environment of the client and performance information that is associated with operation(s) being performed by the client based on the operating environment. Further, a service component can infer a relationship between the contextual information and the performance information to obtain correlation information, and the interface component can send, based on correlation information, configuration information, or update information, to the client.

In an embodiment, the contextual information includes information indicating a configuration of hardware and/or software of a client, a configuration of a network that is communicatively coupled to the client, and/or information indicating a location of the client. Further, the configuration information includes information indicating a recommendation to update, upgrade, not update, not upgrade, etc. software and/or hardware of the client.

In another embodiment, the performance information includes information indicating a consumption of memory that is associated with an operating system of the client, software of the client, and/or firmware of the client, an input/output bandwidth that is associated with execution, by the client, of the operating system, the software, and/or the firmware, a bandwidth of a network that is communicatively coupled to the client, and/or a latency that is associated with the network.

In another non-limiting implementation, a method can include storing, by a computing device, contextual information indicating portion(s) of an operating environment that is associated with portion(s) of operation(s) performed by the computing device. Further, the method can include sending the contextual information and performance information that is associated with the portion(s) of the operation(s) to a service component. Furthermore, the method can include receiving, based on the contextual information and the performance information, configuration information from the service component for configuring the computing device.

In one embodiment, the storing the contextual information further includes populating a cache with portion(s) of the contextual information to obtain cached information, and sending portion(s) of the cached information to the service component. In another embodiment, the method can include configuring software and/or hardware of the computing device based on the configuration information.

In another embodiment, a method can include receiving, by a service component of a first computing device, contextual information from clients indicating respective operating environments of the clients and storing the contextual information in a data store; receiving performance information that is associated with respective operations being performed by the clients in the respective operating environments; and storing the performance information in the data store. Then, in response to correlating the contextual information with the performance information utilizing the data store, a recommended configuration of a second computing device can be inferred. Further, the recommended configuration can be communicated to the second computing device.

Other embodiments and various non-limiting examples, scenarios, and implementations are described in more detail below.

BRIEF DESCRIPTION OF THE DRAWINGS

Various non-limiting embodiments are further described with reference to the accompanying drawings in which.

DETAILED DESCRIPTION

Overview

Figure 1:
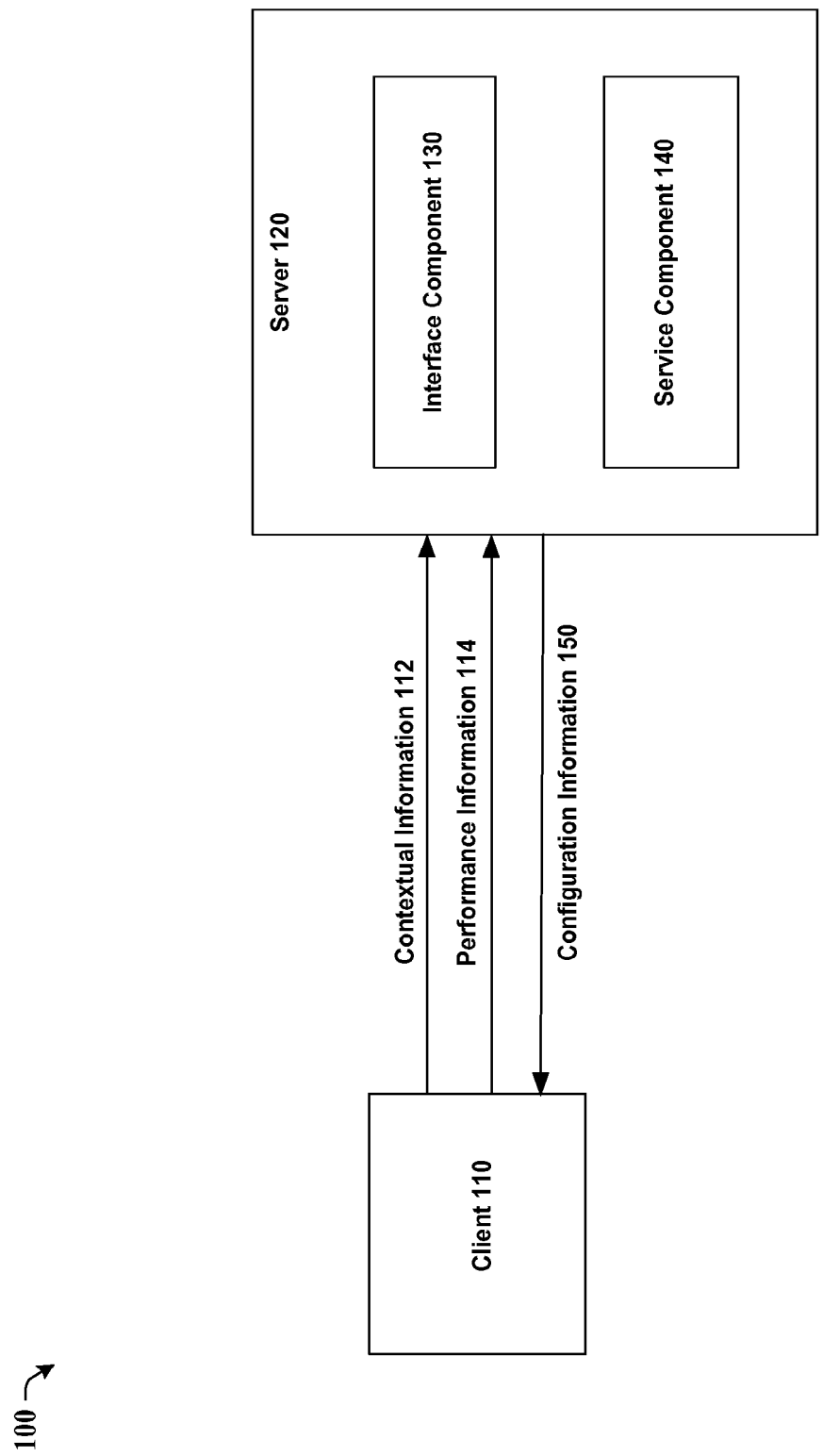
FIG. 1 illustrates an exemplary environment for monitoring performance information of a device for anticipatorily sending update information to the device according to an embodiment.

As indicated in the background, conventional computing technologies do not monitor operating performance of a device and anticipatorily send update information to the device based on the operating performance. In consideration of these and other deficiencies of the conventional technologies, the subject matter disclosed herein relates to correlating contextual and performance information of the device, and sending configuration information to the device based on such information.

In one embodiment, a method comprises receiving, by a service component of a first computing device, contextual information indicating one or more portions of an operating environment of a second computing device; and receiving performance information that is associated with one or more operations being performed by the second computing device in the operating environment. Then, in response to correlating the contextual information with the performance information, communicating configuration information to the second computing device.

In another non-limiting implementation, a computer-readable storage medium is provided comprising computer executable instructions that, in response to execution, cause a computing device to perform operations. The operations include storing, by the computing device, contextual information indicating portion(s) of an operating environment that is associated with portion(s) of the operations.

Further, the method can include sending the contextual information and performance information that is associated with at least one operation of the operations being performed by the computing device to a service component. Furthermore, the method can include receiving, based on the contextual information and the performance information, configuration information from the service component for configuring the computing device.

In one embodiment, a system comprises an interface component stored in a computable readable storage medium configured to: receive, from a client, contextual information indicating an operating environment of the client and performance information that is associated with one or more operations being performed by the client based on the operating environment. Further, the interface component can send, based on correlation information, update information to the client. Furthermore, a service component can infer a relationship between the contextual information and the performance information to obtain the correlation information.

In another embodiment, a method can include receiving, by a service component of a first computing device, contextual information from clients indicating respective operating environments of the clients and storing the contextual information in a data store, such as a database; receiving performance information that is associated with respective operations being performed by the clients in the respective operating environments and storing the performance information in the data store; in response to correlating the contextual information with the performance information utilizing the data store, inferring a recommended configuration of a second computing device; and communicating the recommended configuration to the second computing device.

Such techniques enable monitoring performance information of a device for anticipatorily sending configuration information to the device.

Figure 2:
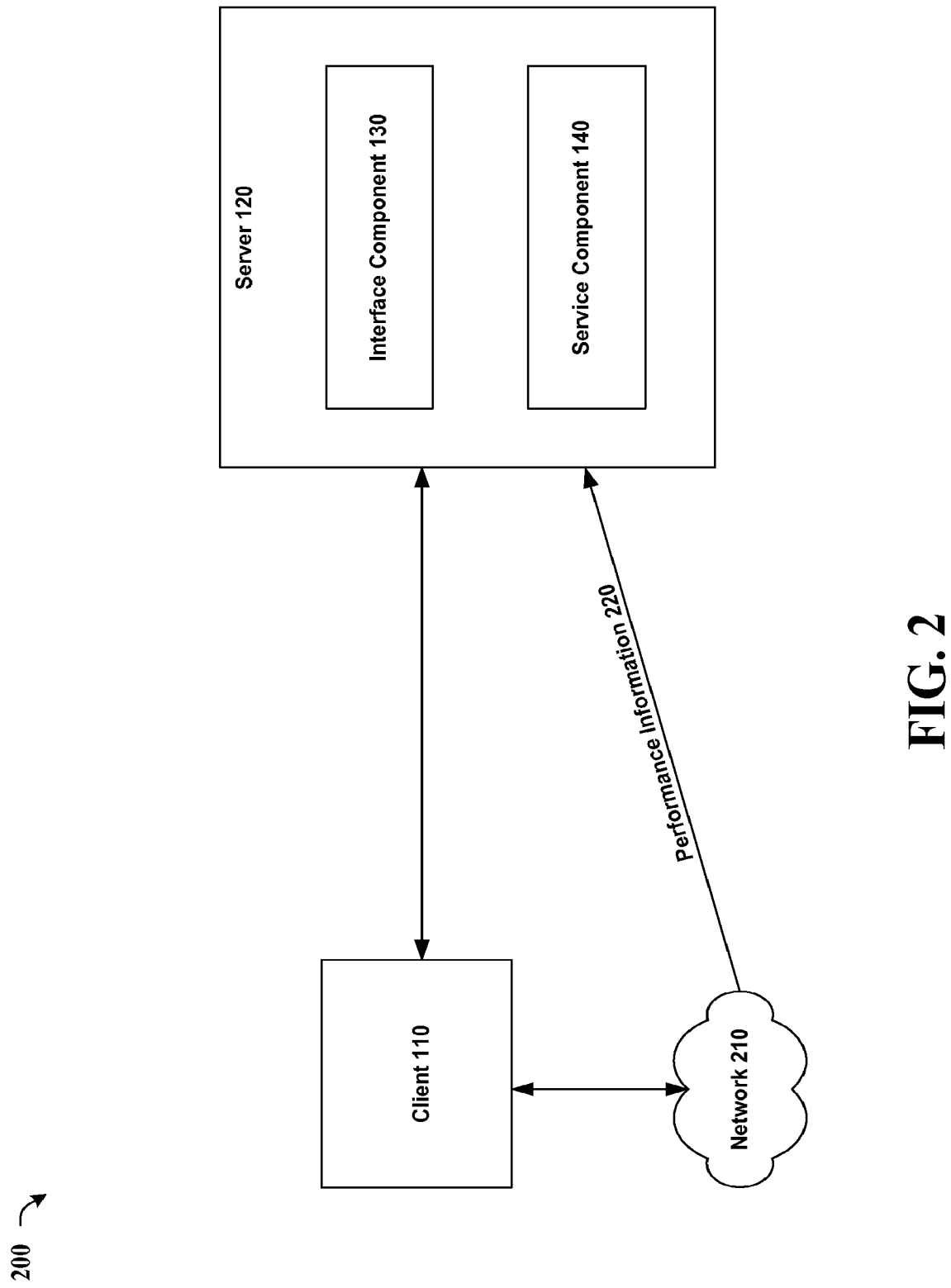
FIG. 2 illustrates another exemplary environment for monitoring performance information of a device for anticipatorily sending update information to the device according to an embodiment.
Figure 3:
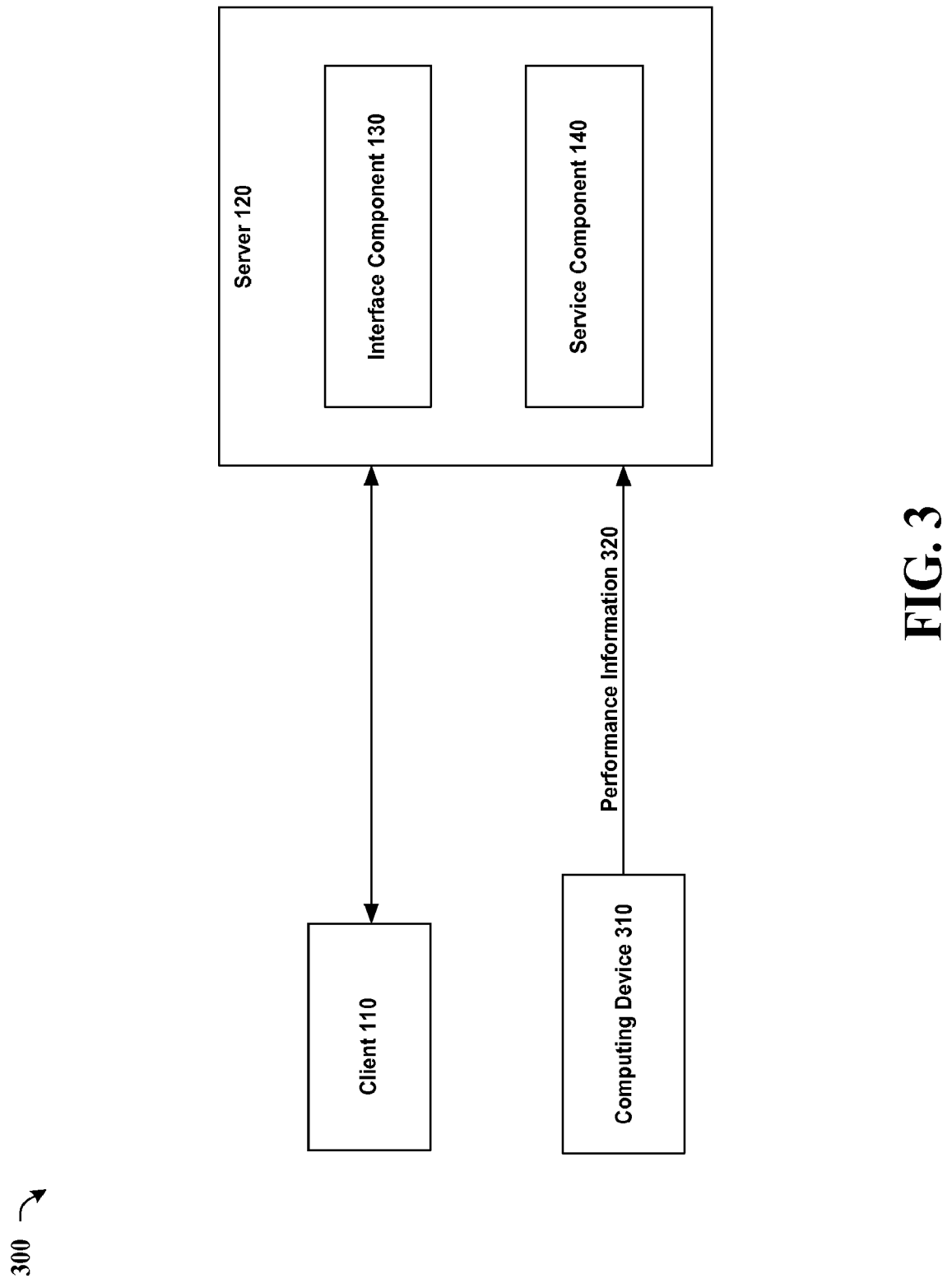
FIG. 3 illustrates yet another exemplary environment for monitoring performance information of a device for anticipatorily sending update information to the device according to an embodiment.

Monitoring Performance Information of a Device for Anticipatorily Sending Configuration Information to the Device Referring now to FIGS. 1-3, service environments (100, 200, 300) including sever 120, e.g., associated with a network based information service, are depicted according to various embodiments. For the avoidance of doubt, any network service or service component described in the specification, depicted in the drawings, or claimed herein is applicable to any service or component to which the device can interface, including any form of wired, wireless, or device or component-based communication, including, but not limited to, Ethernet, synchronous optical network (SONET), asynchronous transfer mode (ATM), universal serial bus (USB), or so-called 'sneakernet' communication via shared devices, such as, but again not limited to, floppy disks or jump drives. Thus, terms such as "service component" or "network based service" shall be construed consistent such view of what a service component or network based service can be.

Server 120 includes interface component 130 and service component 140. Interface component 130 can receive, e.g., from client 110 via the network based information service, contextual information 112 indicating an operating environment, e.g., service environment 100, service environment 200, service environment 300, etc. of client 110. In an aspect, contextual information 112 can include information indicating a configuration of an operating system of client 110, software of client 110, firmware of client 110, and/or hardware of client 110; a configuration of network 210 that is communicatively coupled to client 110; and/or information indicating a location of client 110. In addition to contextual information, user preference information can be received, information about inferred future activity, current activity, or past activity of the user can be received as input. Accordingly, any of contextual information, user preference or user activity can be a basis for communication of configuration information.

Further, interface component 130 can receive from client 110, network 210, and computing device 310, information including performance information 114, performance information 220, and performance information 320, respectively. In an embodiment, performance information 114 can be associated with operation(s) performed by client 110, e.g., via an operating system, software, firmware, etc. based on the operating environment. In one aspect, performance information 114 can include information indicating a consumption of memory that is associated with the operation(s), and/or information indicating an input/output bandwidth that is associated with the operation(s).

In another embodiment, performance information 220 can include information indicating a bandwidth of network 210 and/or a latency that, for example, is associated with processing data via network 210. In yet another embodiment, performance information 320 can include information indicating a configuration of hardware of computing device 310. In various aspects, computing device can be communicatively coupled to network 210, communicatively coupled to a network different from network 210, etc. In one aspect, performance information 320 can include information indicating a configuration of software, hardware, firmware, an operating system, etc. of computing device 310 and/or a performance of computing device 310.

Various aspects of exemplary, non-limiting embodiments disclosed herein can monitor contextual information 112 and performance information, e.g., performance information 114, performance information 220, performance information 320, etc. to anticipatorily and/or proactively provide, send, etc. update information, upgrade information, configuration information 150, etc. to client 110, e.g., for identifying application(s), software patch(es), software update(s), operating system update(s), firmware update(s), hardware update(s), etc. to improve operating performance of client 110.

As such, in one embodiment, service component 140 can be configured to correlate contextual information 112 with performance information 114, performance information 220, and/or performance information 320. For example, service component 140 can infer a relationship between contextual information 112 and performance information 114, performance information 220, and/or performance information 320 to obtain, derive, compute, etc. correlation information.

In one example, service component 140 can infer, based on performance information 114 indicating an excessive amount of memory and/or CPU cycles being consumed by client 110, correlation information indicating that client 110 is performing slowly, acting sluggishly, etc. in response to software and/or an application being executed by client 110, e.g., as indicated by contextual information 112. As such, service component 140 can infer causation of at least a portion of performance information 114 from one or more portions of contextual information 112.

For example, in one or more aspects, service component 140 can include one or more data structures (not shown) associated with the contextual information and the correlation information, and can be centralized or distributed, potentially across multiple devices and/or schemas. In accordance therewith, in order to provide for or aid in inference(s), correlation(s), described herein, service component 140 can examine the entirety or a subset of the data available and can provide for reasoning about or infer states of respective system(s), environment(s), and/or user(s) from a set of observations as captured via events and/or data.

Further, inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action, correlation(s), etc. in connection with the claimed subject matter.

A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, where the hypersurface attempts to split the triggering criteria from the non-triggering events. Intuitively, this makes the classification correct for testing data that is near, but not identical to training data.

Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Referring again to FIGS. 1-3, interface component 130 can send, communicate, etc. configuration information 150, the update information, the upgrade information, etc. to client 110 based on the correlation information. In an aspect, configuration information 150 can (1) include a recommendation to update, upgrade, etc. an operating system, software, firmware, hardware, etc. of client 110; (2) include a recommendation to not install an update, an upgrade, etc. of the operating system, the software, the firmware, the hardware, etc.; (3) indentify application(s), software, patch(es), software update(s), hardware update(s), firmware update(s), operating system update(s), etc. that can be installed, performed on, etc. client 110, e.g., for improving operating performance of client 110; and/or (4) include a recommendation to utilize a network protocol and/or a communication protocol.

For example, in response to contextual information 112 indicating that client 110 was communicatively coupled to a first device, e.g., a peripheral device, a printer, a scanner, a gaming device, etc. interface component 130 can send configuration information 150, e.g., derived via service component 140, to client 110 indicating that hardware and/or software update(s), software patch(es), operating system update(s), firmware update(s), etc. associated with a second device (or a second peripheral device) that, e.g., is not communicatively coupled to client 110, be skipped or not performed. In another example, in response to contextual information 112 indicating a pattern, a series, etc. of files being selected via client 110, interface component 130 can send configuration information 150, e.g., derived via service component 140, to client 110 indicating hardware and/or software update(s), software patch(es), operating system update(s), firmware update(s), etc. associated with the files to install in client 110.

In another aspect, in response to contextual information 112 indicating a pattern, a series, etc. of a type of software, application, operating system, firmware, etc. being installed on client 110, interface component 130 can send configuration information 150, e.g., derived via service component 140, to client 110 indicating, recommending, etc. that hardware and/or software update(s), software patch(es), operating system update(s), firmware update(s), etc. be made to client 110 based on the type of software, application, operating system, firmware, etc. being installed on client 110.

In an aspect illustrated by FIG. 3, server 120 can receive configuration information from computing device 310 indicating a configuration of hardware and/or software of computing device 310. Further, server 120 can receive performance information 320 from computing device 310, e.g., indicating a consumption of memory that is associated with an operating system, software, firmware, etc. being executed via computing device 310. Furthermore, service component 140 can determine, infer, etc. configuration information 150 based on the configuration information and performance information 320. For example, in response to operating system, hardware, firmware, and/or software aspect(s) of computing device 310 being compatible with client 110, service component 140 can recommend, via configuration information 150, update(s) be made to an operating system, hardware, firmware, and/or software of client 110.

In another aspect, server 120 can receive information of communication(s), e.g., network queries, social network queries, etc. made via computing device 310. Further, service component 140 can determine causation of at least a portion of performance information 114, 220, 320, etc. from portion(s) of the information of the communication(s). As such, service component 140 can correlate and/or leverage knowledge, e.g., about spike(s) in third party searches, network queries, messages, etc., for example, associated with hardware and/or software issues, to determine, infer, etc. configuration information 150.

Figure 4:
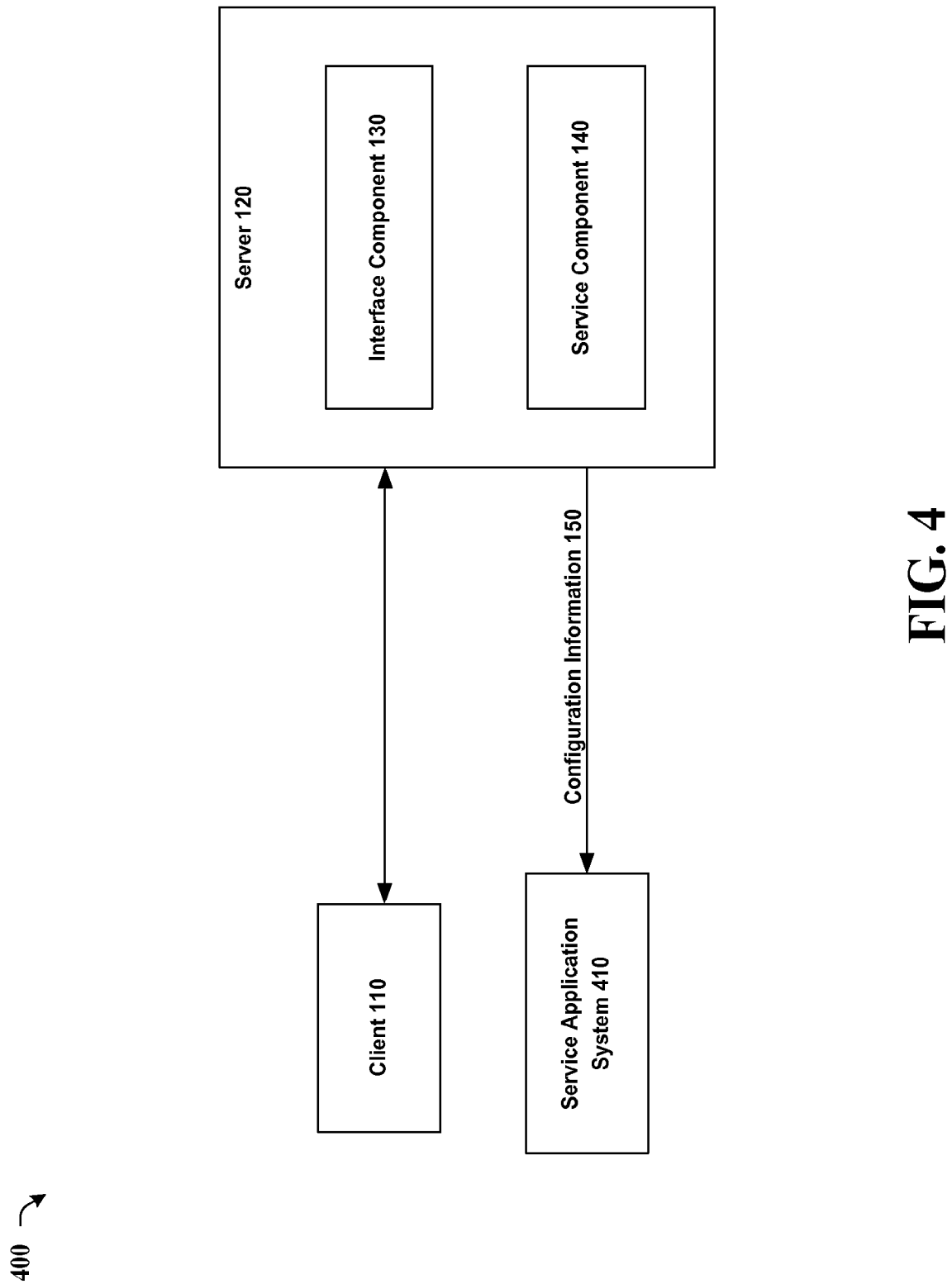
FIG. 4 illustrates an exemplary environment including a service application system according to an embodiment.

In one aspect illustrated by FIG. 4, service component 140 can be configured to communicate at least a portion of configuration information 150 to a computing device of service application 410, e.g., which can be associated with a source, manufacturer, developer, etc. of hardware, firmware, an operating system, software, etc. operating on and/or communicatively coupled to client 110, e.g., for recording information, logs, error logs, etc. associated with operation(s) of client 110.

Figure 5:
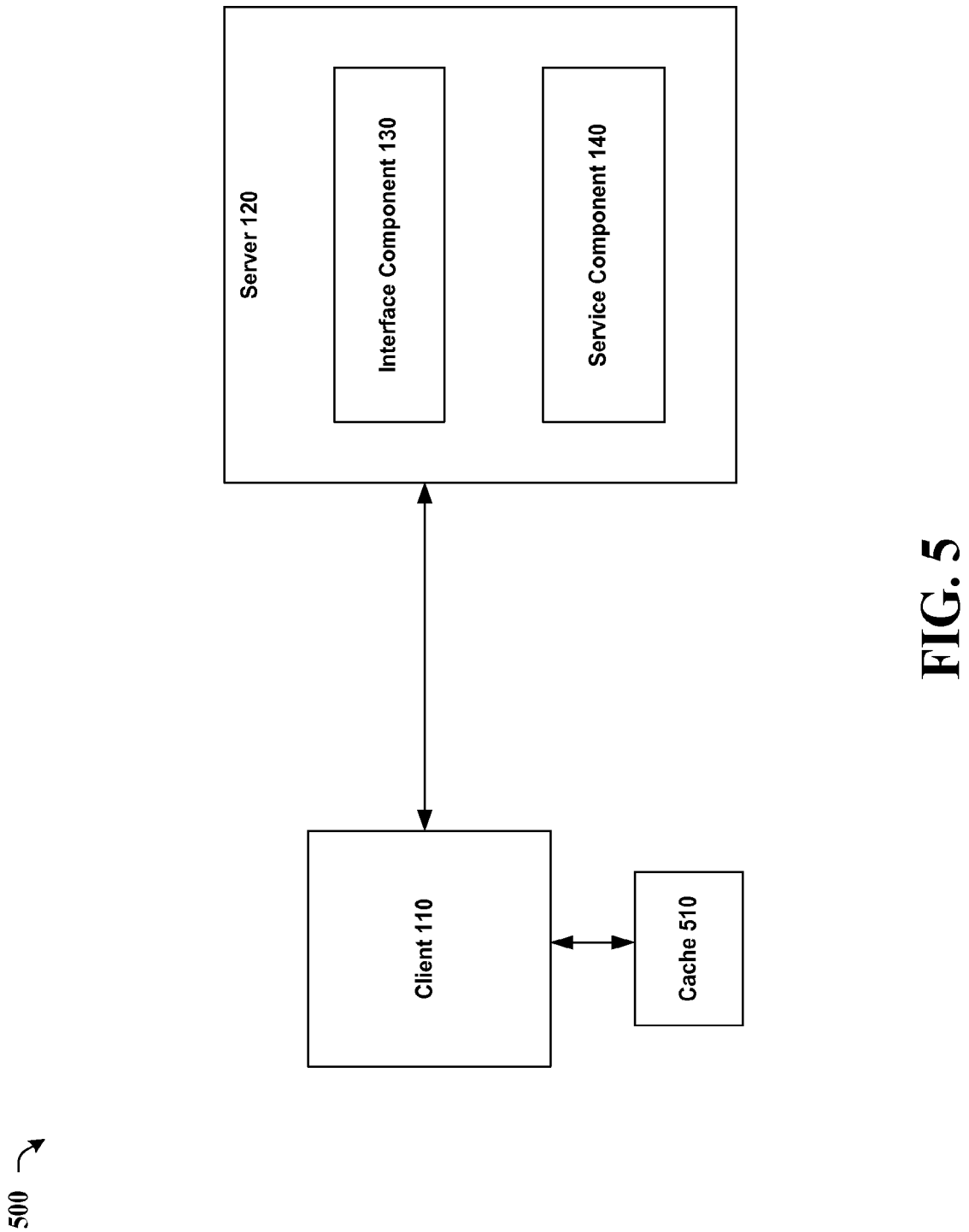
FIG. 5 illustrates an exemplary environment including a cache according to an embodiment.

Now referring to FIG. 5, client 110 can be associated with a computer-readable storage medium comprising computer executable instructions that, in response to execution, cause client 110 to store contextual information indicating one or more portions of operating environment 500. Further, client 110 can send the contextual information and performance information that is associated with at least one operation of operations performed by client 110 to server 120, e.g., interface component 130. Furthermore, client 110 can receive, based on the contextual information and the performance information, configuration information, e.g., from service component 140, for configuring client 110.

In one aspect, the contextual information can include information indicating a configuration of hardware of client 110 and/or software of client 110, a configuration of a network (not shown) that is communicatively coupled to client 110, and/or information indicating a location of client 110.

In another aspect, the performance information can be associated with the at least one operation, e.g., indicating a consumption of memory that is associated with an operating system of client 110, software being executed by client 110, firmware being executed by client 110, etc. In yet another aspect, client 110 can populate cache 510 with at least a portion of the contextual information to obtain cached information. Further, client 110 can send at least a portion of the cached information to server 120, e.g., service component 140. In one aspect, client 110 can configure software, hardware, firmware, an operating system, etc. of client 110 based on the configuration information.

Figure 6:
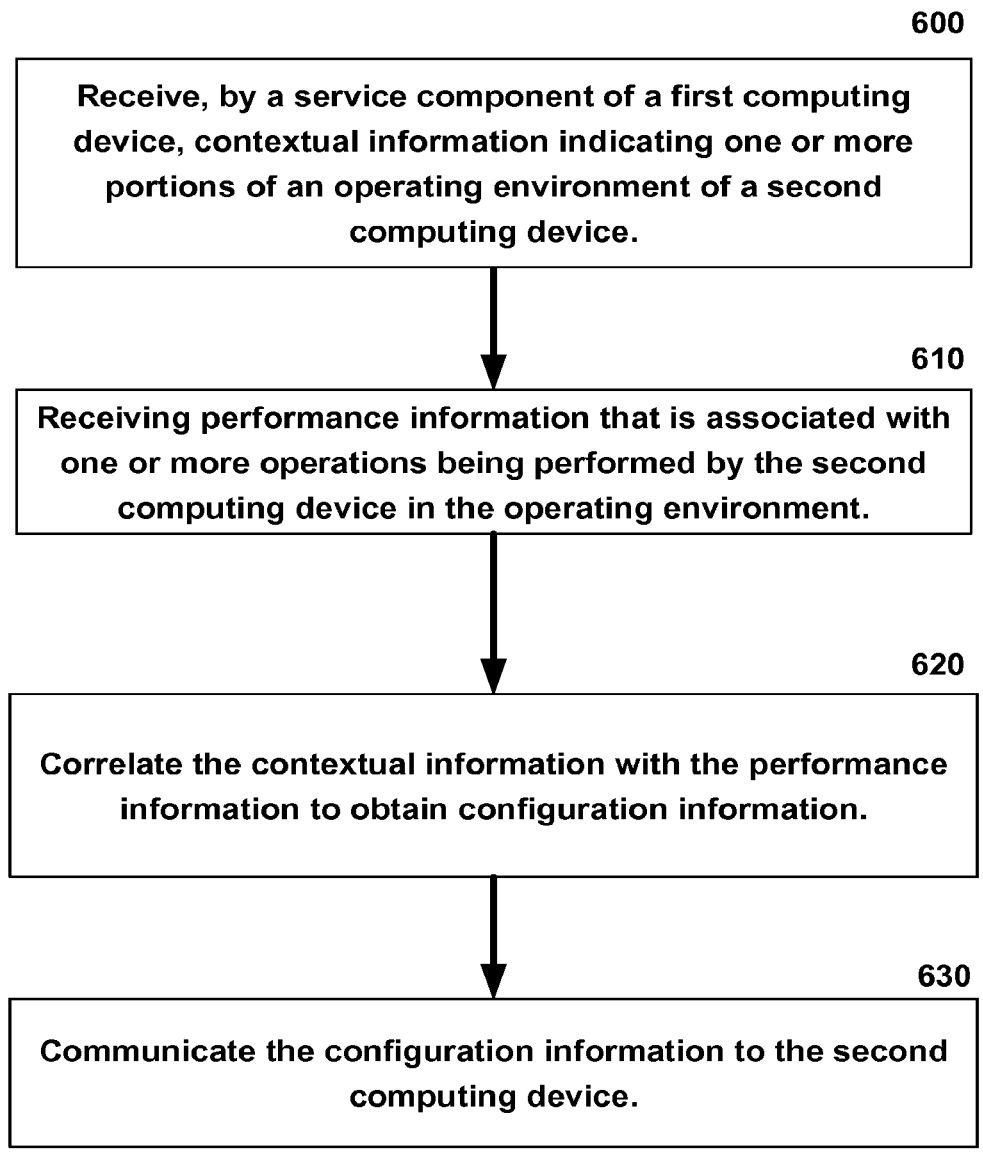
FIGS. 6-9 illustrate exemplary processes according to various embodiments.

FIG. 6 is a flow diagram illustrating an exemplary non-limiting embodiment for monitoring performance information of a device for anticipatorily sending update information to the device according to an embodiment. At 600, a service component of a first computing device can receive contextual information indicating one or more portions of an operating environment of a second computing device. At 610, performance information that is associated with one or more operations being performed by the second computing device in the operating environment can be received, e.g., by the first computing device. At 620, the contextual information can be correlated with the performance information to obtain configuration information. At 630, the configuration information can be communicated to the second computing device.

In one embodiment, the contextual information includes information indicating a configuration of hardware, software, firmware, and/or an operating system of the second computing device. In another embodiment, the contextual information includes information indicating a location of the second computing device. In yet another embodiment, the contextual information includes information indicating a configuration of a network that is communicatively coupled to the second computing device.

In an embodiment, the performance information includes information indicating a consumption of memory that is associated with the hardware, the software, the firmware, and/or the operating system, e.g., being executed and/or operated by the second computing device. Another embodiment includes receiving information indicating an input/output bandwidth that is associated with the software, the firmware, the operating system, etc., e.g., being executed by the second computing device. Yet another embodiment includes receiving information indicating a bandwidth of a network that is communicatively coupled to the second computing device, and/or receiving information indicating a latency that is associated with processing data via the network.

Figure 7:
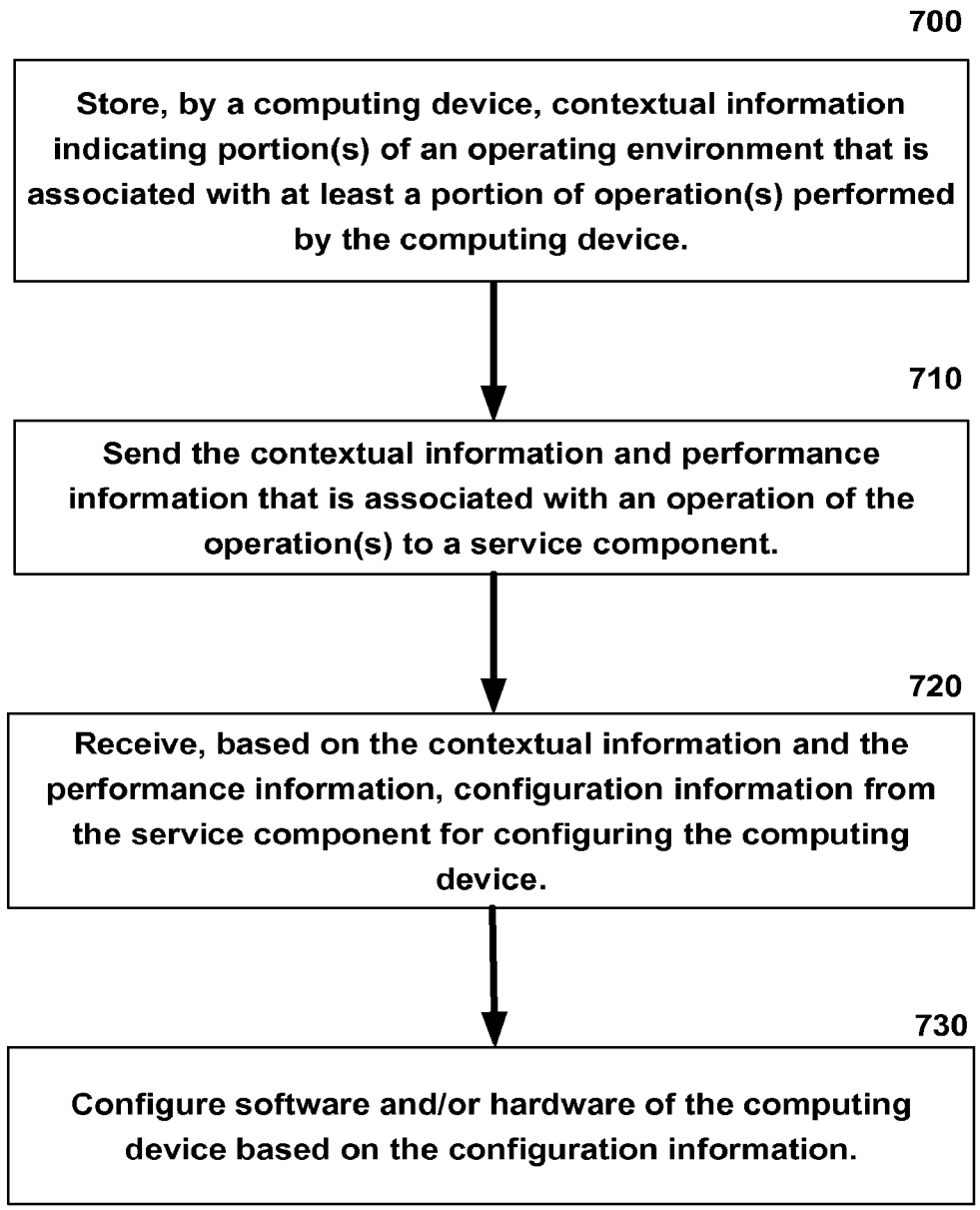

FIG. 7 is a flow diagram illustrating another exemplary non-limiting embodiment for monitoring performance information of a device for anticipatorily sending update information to the device according to an embodiment. At 700, contextual information indicating portion(s) of an operating environment that is associated with at least a portion of operation(s) performed by a computing device can be stored by the computing device. At 710, the contextual information and performance information that is associated with an operation of the operation(s) can be sent by the computing device to a service component. At 720, configuration information sent by the service component can be received, by the computing device based on the contextual information and the performance information, from the service component for configuring the computing device. At 730, software, firmware, an operating system, and/or hardware of the computing device can be configured, e.g., by the computing device, based on the configuration information.

Figure 8:
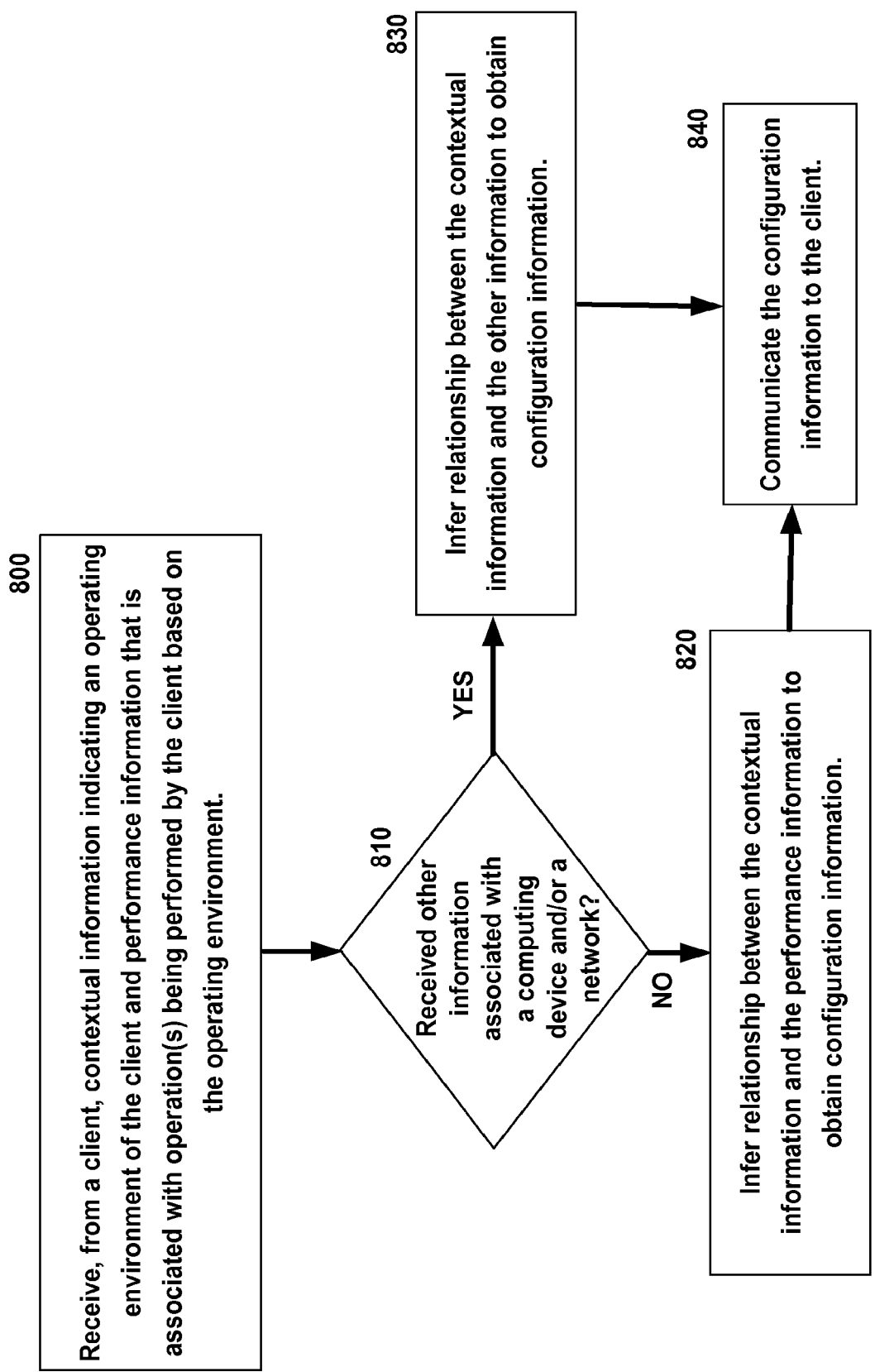

FIG. 8 is a flow diagram illustrating yet another exemplary non-limiting embodiment for monitoring performance information of a device for anticipatorily sending update information to the device according to an embodiment. At 800, contextual information indicating an operating environment of a client, and performance information that is associated with operation(s) being performed by the client based on the operating environment, can be received from the client. At 810, if other information that is associated with a computing device, e.g., of another client, and/or a network is received, flow continues to 830, at which a relationship between the contextual information and the other information can be inferred to obtain configuration information; otherwise, flow continues to 820, at which a relationship between the contextual information and the performance information can be inferred to obtain the configuration information.

Flow continues from 820 and 830 to 840, at which the configuration information can be communicated to the client. For example, in an embodiment, the configuration information can include recommendations for updating at least one of hardware and/or software of the client.

Figure 9:
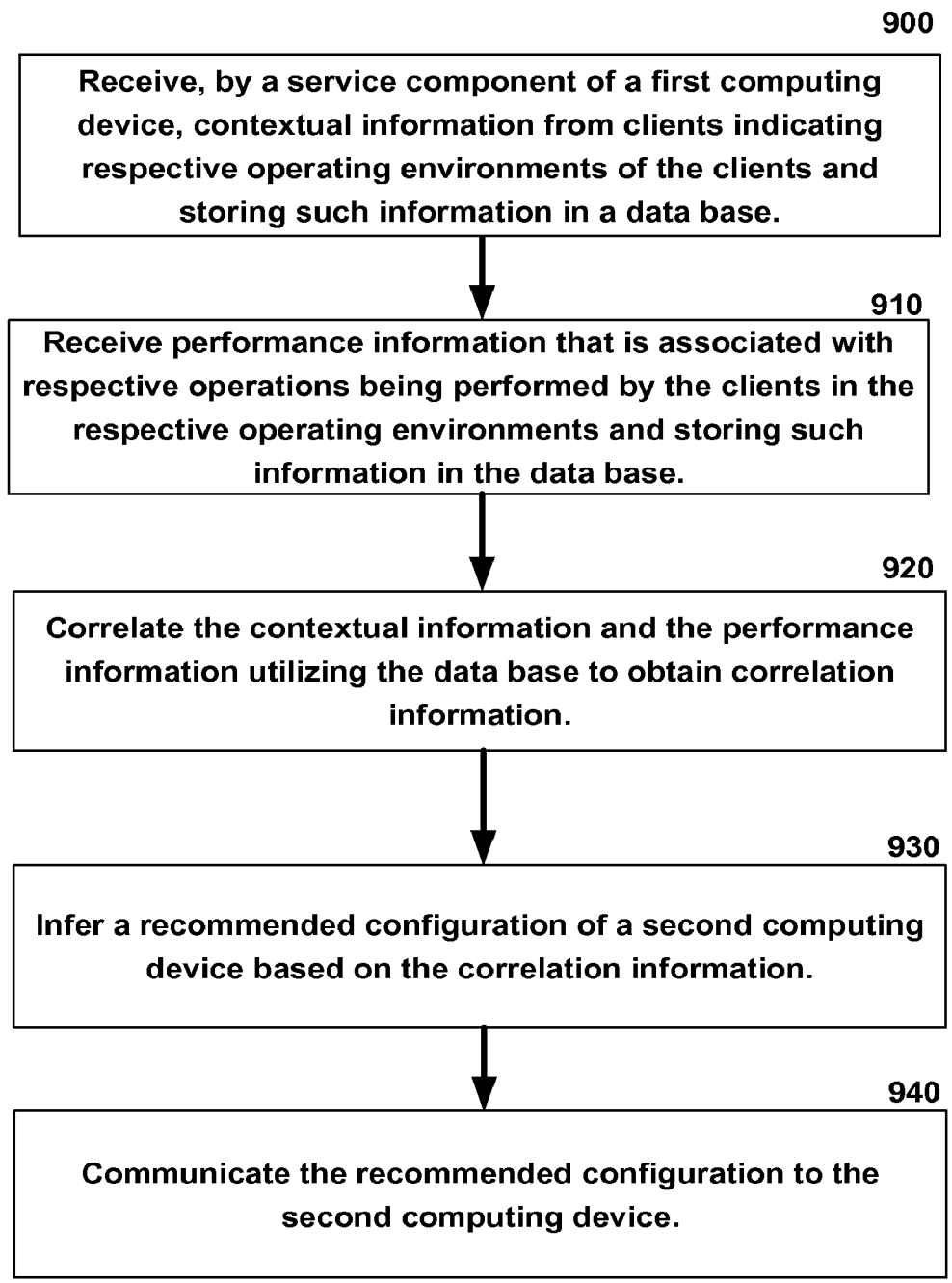

FIG. 9 is a flow diagram illustrating an exemplary non-limiting embodiment for monitoring the performance of clients for anticipatorily sending update, or configuration, information to a device according to an embodiment. At 900, contextual information indicating respective operating environments of the clients can be received from the clients and stored in a data store. At 910, performance information that is associated with respective operations being performed by the clients in the respective operating environments can be received and stored in the data store. At 920, the contextual information and the performance information can be correlated, utilizing the data store, to obtain correlation information. At 930, a recommended configuration of a second computing device can be inferred based on the correlation information. At 940, the recommended configuration information can be communicated to the second computing device.

Exemplary Networked and Distributed Environments

One of ordinary skill in the art can appreciate that the various embodiments for monitoring contextual and performance information of a device for anticipatorily sending update information to the device described herein can be implemented in connection with any computer or other client device, e.g., client 110, server 120, etc. Such device can be deployed as part of a computer network or in a distributed computing environment, and can be connected to any kind of data store where media may be found.

In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in mechanisms for performing operations associated with monitoring contextual and performance information of a device described for various embodiments of the subject disclosure.

Figure 10:
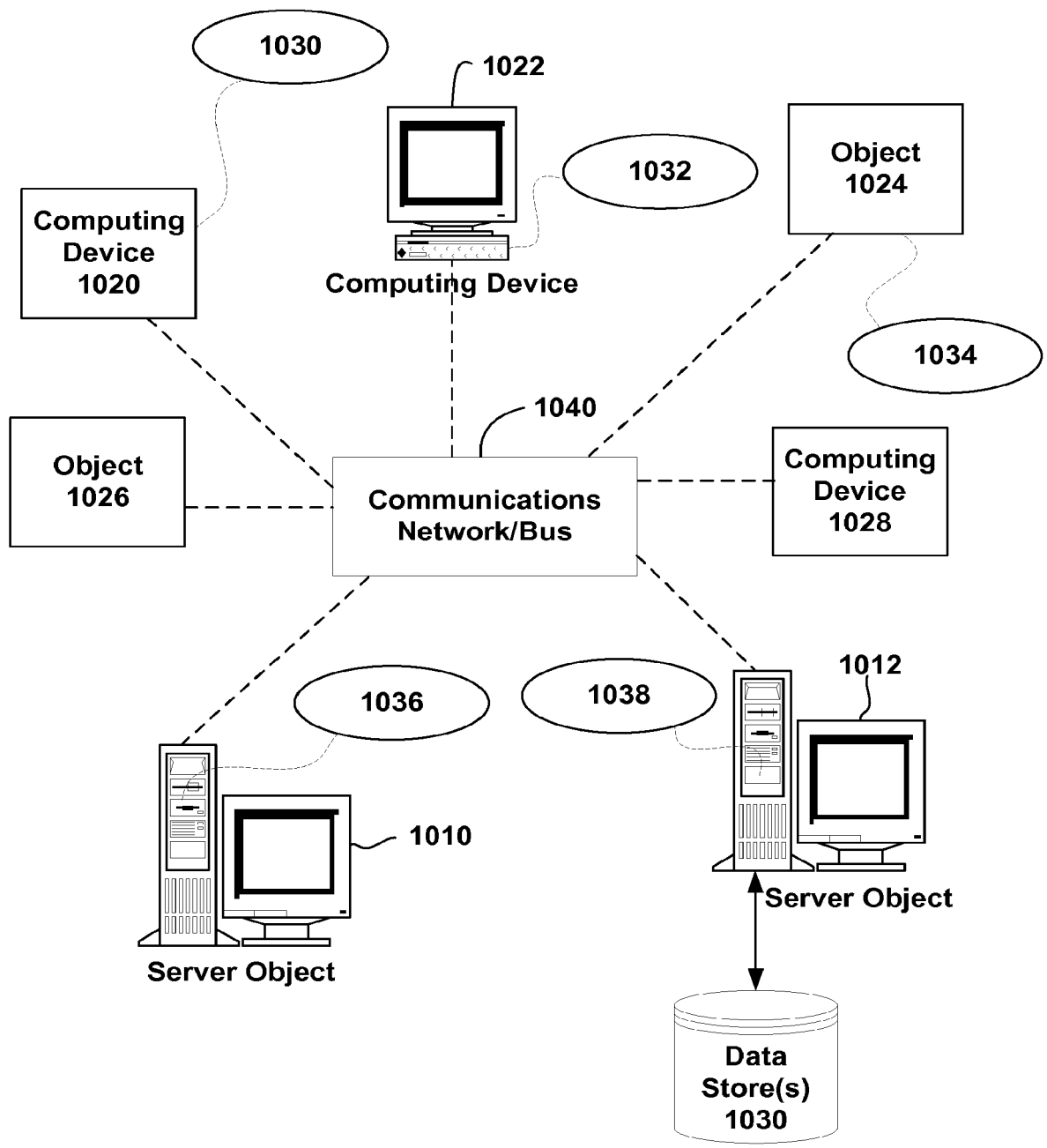
FIG. 10 is a block diagram representing exemplary non-limiting networked environments in which various embodiments described herein can be implemented.

FIG. 10 provides a schematic diagram of an exemplary networked or distributed computing environment. The distributed computing environment comprises computing objects 1010, 1012, etc. and computing objects or devices 1020, 1022, 1024, 1026, 1028, etc., which may include programs, methods, data stores, programmable logic, etc., as represented by applications 1030, 1032, 1034, 1036, 1038. It can be noted that computing objects 1010, 1012, etc. and computing objects or devices 1020, 1022, 1024, 1026, 1028, etc. may comprise different devices, such as PDAs, audio/video devices, mobile phones, MP3 players, personal computers, laptops, etc.

Each computing object 1010, 1012, etc. and computing objects or devices 1020, 1022, 1024, 1026, 1028, etc. can communicate with one or more other computing objects 1010, 1012, etc. and computing objects or devices 1020, 1022, 1024, 1026, 1028, etc. by way of the communications network 1040, either directly or indirectly. Even though illustrated as a single element in FIG. 10, communications network/bus 1040 may comprise other computing objects and computing devices that provide services to the system of FIG. 10, and/or may represent multiple interconnected networks, which are not shown. Each computing object 1010, 1012, etc. or computing objects or devices 1020, 1022, 1024, 1026, 1028, etc. can also contain an application, such as applications 1030, 1032, 1034, 1036, 1038, that might make use of an API, or other object, software, firmware and/or hardware, suitable for communication with or implementation of the techniques for monitoring contextual and performance information of a device provided in accordance with various embodiments of the subject disclosure.

There are varieties of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems for monitoring contextual and performance information of a device as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client, e.g., client 110, is usually a computer, that accesses shared network resources provided by another computer, e.g., server 120. In the illustration of FIG. 10, as a non-limiting example, computing objects or devices 1020, 1022, 1024, 1026, 1028, etc. can be thought of as clients and computing objects 1010, 1012, etc. can be thought of as servers in which computing objects 1010, 1012, etc. provide data services, such as receiving data from client computing objects or devices 1020, 1022, 1024, 1026, 1028, etc., storing of data, processing of data, transmitting data to client computing objects or devices 1020, 1022, 1024, 1026, 1028, etc., although any computer can be considered a client, a server, or both, depending on the circumstances. Any of these computing devices may be processing data, or requesting transaction services or tasks that may implicate the techniques for monitoring contextual and performance information of a device as described herein for one or more embodiments.

A server, e.g., server 110, is typically a remote computer system accessible over a remote or local network, such as the Internet or wireless network infrastructures. The client process may be active in a first computer system, and the server process may be active in a second computer system, e.g., related to embodiments associated with FIGS. 1-9 disclosed herein, communicating with one another over a communications medium, thus providing distributed functionality and allowing multiple clients to take advantage of the information-gathering capabilities of the server. Any software objects utilized pursuant to the techniques for monitoring contextual and performance information of a device can be provided standalone, or distributed across multiple computing devices or objects.

In a network environment in which the communications network/bus 1040 is the Internet, for example, e.g., related to embodiments associated with FIGS. 1-9 disclosed herein, the computing objects 1010, 1012, etc. can be Web servers with which the client computing objects or devices 1020, 1022, 1024, 1026, 1028, etc. communicate via any of a number of known protocols, such as HTTP. Servers 1010, 1012, etc. may also serve as client computing objects or devices 1020, 1022, 1024, 1026, 1028, etc., as may be characteristic of a distributed computing environment.

Exemplary Computing Device

Figure 11:
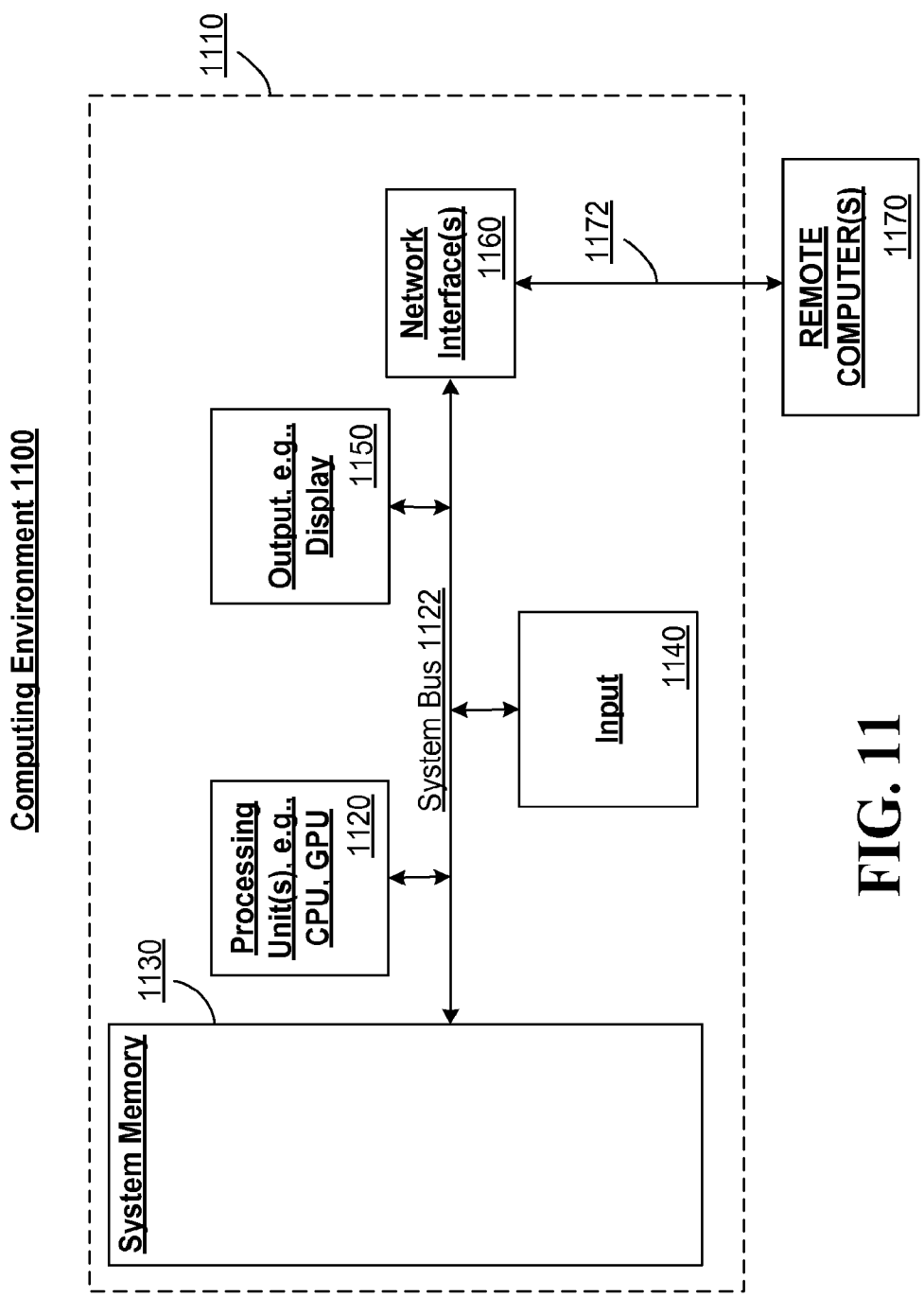
FIG. 11 is a block diagram representing an exemplary non-limiting computing system or operating environment in which one or more aspects of various embodiments described herein can be implemented.

As mentioned, advantageously, the techniques described herein can be applied to any device where it is desirable to monitor contextual and performance information of a device. It is to be understood, therefore, that handheld, portable and other computing devices and computing objects of all kinds are contemplated for use in connection with the various embodiments, i.e., anywhere that a device can enable a server to perform operations associated with monitoring contextual and performance information of a device. Accordingly, the below general purpose computer described below in FIG. 11 is but one example of a computing device. Additionally, a server, or a database server, e.g., associated with the service application described above, can include one or more aspects of the below general-purpose computer.

Although not required, embodiments can partly be implemented via an operating system, for use by a developer of services for a device or object, and/or included within application software, e.g., associated with server 120, which operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 11 thus illustrates an example of a suitable computing system environment 1100 in which one or aspects of the embodiments described herein can be implemented, although as made clear above, the computing system environment 1100 is only one example of a suitable computing environment and is not intended to suggest any limitation as to scope of use or functionality. Neither is the computing environment 1100 interpreted as having any dependency or requirement relating to any one or combination of components illustrated in the exemplary operating environment 1100.

With reference to FIG. 11, an exemplary remote device for implementing one or more embodiments includes a general-purpose computer, or computing device, in the form of computer 1110. Components of computer 1110 may include, but are not limited to, a processing unit 1120, a system memory 1130, and a system bus 1122 that couples various system components including the system memory to the processing unit 1120.

Computer 1110 typically includes a variety of computer readable media and can be any available media that can be accessed by computer 1110. The system memory 1130 may include computer storage media in the form of volatile and/or nonvolatile memory such as read only memory (ROM) and/or random access memory (RAM). By way of example, and not limitation, memory 1130 may also include an operating system, application programs, other program modules, and program data.

A user can enter commands and information into computer 1110 through input devices 1140. A monitor or other type of display device is also connected to the system bus 1122 via an interface, such as output interface 1150. In addition to a monitor, computers can also include other peripheral output devices such as speakers and a printer, which may be connected through output interface 1150.

Computer 1110 may operate in a networked or distributed environment using logical connections to one or more other remote computers, such as remote computer 1170. The remote computer 1170 may be a personal computer, a server, a router, a network PC, a peer device or other common network node, or any other remote media consumption or transmission device, and may include any or all of the elements described above relative to computer 1110. The logical connections depicted in FIG. 11 include a network 1172, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. that enables applications and services to take advantage of the techniques for monitoring contextual and performance information of a device described herein. Thus, embodiments herein are contemplated from the standpoint of an API (or other software object), as well as from a software or hardware object that implements one or more aspects of such techniques. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media.

By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal, such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be noted that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical).

Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that can be implemented in accordance with the described subject matter will be better noted with reference to the flowcharts of the various figures. While for purposes of simplicity of explanation, the methodologies are shown and described as a series of blocks, it is to be understood and noted that the claimed subject matter is not limited by the order of the blocks, as some blocks may occur in different orders and/or concurrently with other blocks from what is depicted and described herein. Where non-sequential, or branched, flow is illustrated via flowchart, it can be noted that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be affected across a plurality of devices. Accordingly, the embodiments are not to be limited to any single embodiment, but rather can be construed in breadth, spirit and scope in accordance with the appended claims.

What is claimed is:

1. A system, comprising:
   memory; and
   at least one processor coupled to the memory, the at least one processor configured to:
   receive, from a client device,
   contextual information indicating a pattern of files associated with the client device or a series of files associated with the client device, and
   performance information indicating at least one of:
   consumption of memory of the client device,
   consumption of processor cycles of the client device,
   configuration of at least one of hardware, software, firmware, or an operating system of the client device,
   input/output bandwidth of the client device,
   bandwidth of a network that is communicatively coupled to the client device, or
   latency associated with the network;
   infer a causation relationship between:
   the pattern of files associated with the client device or the series of files associated with the client device, and
   the performance information; and
   in response to the inferred causation relationship, provide, to the client device, configuration information that:
   identifies at least one of the following, which is configured to improve operating performance of the client device:
   at least one application, or
   at least one update; and
   is based at least in part on:
   the pattern of files associated with the client device or the series of files associated with the client device,
   the performance information, and
   an inference from a probability distribution over states in accordance with a classification scheme that maps an input attribute vector associated with an input to a confidence that the input belongs to a class,
   the input relating to at least one of the pattern of files associated with the client device, the series of files associated with the client device, or the performance information,
   the class corresponding to the configuration information.

2. The system of claim 1, wherein the contextual information further indicates:
   a pattern of a type of at least one of software, firmware, an application, or an operating system being installed on the client device, or
   a series of the type.

3. The system of claim 1, wherein the contextual information includes knowledge about a spike in third party searches associated with at least one of at least one hardware issue or at least one software issue; and
   wherein the at least one processor is configured to:
   infer a relationship between the knowledge about the spike in the third party searches and the performance information; and
   in response to the inferred relationship between the knowledge about the spike in the third party searches and the performance information, provide, to the client device, the configuration information further based at least in part on the knowledge about the spike in the third party searches.

4. The system of claim 1, wherein the at least one processor is configured to, in response to the inferred causation relationship, anticipatorily provide, to the client device, the configuration information.

5. The system of claim 1, wherein the contextual information includes knowledge about a spike in network queries associated with at least one of at least one hardware issue or at least one software issue; and
    wherein the at least one processor is configured to:
        infer a relationship between the knowledge about the spike in the network queries and the performance information; and
        in response to the inferred relationship between the knowledge about the spike in the network queries and the performance information, provide, to the client device, the configuration information further based at least in part on the knowledge about the spike in the network queries.

6. The system of claim 1, wherein the contextual information includes knowledge about a spike in messages associated with at least one of at least one hardware issue or at least one software issue; and
    wherein the at least one processor is configured to:
        infer a relationship between the knowledge about the spike in the messages and the performance information; and
        in response to the inferred relationship between the knowledge about the spike in the messages and the performance information, provide, to the client device, the configuration information further based at least in part on the knowledge about the spike in the messages.

7. The system of claim 1, wherein the at least one processor is configured to:
    receive information associated with at least one social network query performed by at least one third party about at least one of at least one hardware issue or at least one software issue associated with at least one of the contextual information or the performance information;
    infer a relationship between the performance information and the at least one of the at least one hardware issue or the at least one software issue that the at least one social network query is about to obtain correlation information; and
    provide, to the client device, the configuration information based at least in part on the correlation information.

8. The system of claim 1, wherein the at least one processor is configured to:
    receive information indicating performance of a computing device that is different from the client device; and
    wherein the configuration information is further based at least in part on the information indicating the performance of the computing device.

9. A device-implemented method comprising:
    receiving, from a client device,
        contextual information indicating a pattern of files associated with the client device or a series of files associated with the client device, and
        performance information indicating at least one of:
            consumption of memory of the client device,
            consumption of processor cycles of the client device,
            configuration of at least one of hardware, software, firmware, or an operating system of the client device,
            input/output bandwidth of the client device,
            bandwidth of a network that is communicatively coupled to the client device, or
            latency associated with the network;
    inferring a causation relationship between:
        the pattern of files associated with the client device or the series of files associated with the client device, and
        the performance information; and
    in response to the inferred causation relationship, providing, to the client device, configuration information that:
        identifies at least one of the following, which is configured to improve operating performance of the client device:
            at least one application, or
            at least one update; and
        is based at least in part on:
            the pattern of files associated with the client device or the series of files associated with the client device,
            the performance information, and
            an inference from a probability distribution over states in accordance with a classification scheme that maps an input attribute vector associated with an input to a confidence that the input belongs to a class,
                the input relating to at least one of the pattern of files associated with the client device, the series of files associated with the client device, or the performance information,
                the class corresponding to the configuration information.

10. The device-implemented method of claim 9, wherein the contextual information further indicates:
    a pattern of a type of at least one of software, firmware, an application, or an operating system being installed on the client device, or
    a series of the type.

11. The device-implemented method of claim 9, wherein the contextual information includes knowledge about a spike in third party searches associated with at least one of at least one hardware issue or at least one software issue;
    wherein the device-implemented method further comprises:
        inferring a relationship between the knowledge about the spike in the third party searches and the performance information; and
    wherein, in response to the inferred causation relationship, providing the configuration information comprises:
        in response to the inferred relationship between the knowledge about the spike in the third party searches and the performance information, providing, to the client device, the configuration information further based at least in part on the knowledge about the spike in the third party searches.

12. The device-implemented method of claim 9, wherein, in response to the inferred causation relationship, providing the configuration information comprises:
    in response to the inferred causation relationship, anticipatorily providing, to the client device, the configuration information.

13. The device-implemented method of claim 9, wherein the contextual information includes knowledge about a spike in network queries associated with at least one of at least one hardware issue or at least one software issue;
    wherein the device-implemented method further comprises:
        inferring a relationship between the knowledge about the spike in the network queries and the performance information; and wherein, in response to the inferred causation relationship, providing the configuration information comprises:
in response to the inferred relationship between the knowledge about the spike in the network queries and the performance information, providing, to the client device, the configuration information further based at least in part on the knowledge about the spike in the network queries.

14. The device-implemented method of claim 9, wherein the contextual information includes knowledge about a spike in messages associated with at least one of at least one hardware issue or at least one software issue;
wherein the device-implemented method further comprises:
inferring a relationship between the knowledge about the spike in the messages and the performance information; and
wherein, in response to the inferred causation relationship, providing the configuration information comprises:
in response to the inferred relationship between the knowledge about the spike in the messages and the performance information, providing, to the client device, the configuration information further based at least in part on the knowledge about the spike in the messages.

15. The device-implemented method of claim 9, further comprising:
receiving information associated with at least one social network query performed by at least one third party about at least one of at least one hardware issue or at least one software issue associated with at least one of the contextual information or the performance information; and
inferring a relationship between the performance information and the at least one of the at least one hardware issue or the at least one software issue that the at least one social network query is about to obtain correlation information;
wherein, in response to the inferred causation relationship, providing the configuration information comprises:
in response to the inferred causation relationship, providing, to the client device, the configuration information based at least in part on the correlation information.

16. The device-implemented method of claim 9, further comprising:
receiving information indicating performance of a computing device that is different from the client device;
wherein the configuration information is further based at least in part on the information indicating the performance of the computing device.

17. A non-transitory computer-readable storage medium comprising computer executable instructions that, in response to execution, cause a processor-based system to perform operations, the operations comprising:
receiving, from a client device,
contextual information indicating a pattern of files associated with the client device or a series of files associated with the client device, and
performance information indicating at least one of:
consumption of memory of the client device,
consumption of processor cycles of the client device,
configuration of at least one of hardware, software, firmware, or an operating system of the client device,
input/output bandwidth of the client device,
bandwidth of a network that is communicatively coupled to the client device, or
latency associated with the network;
inferring a causation relationship between:
the pattern of files associated with the client device or the series of files associated with the client device, and
the performance information; and
in response to the inferred causation relationship, providing, to the client device, configuration information that:
identifies at least one of the following, which is configured to improve operating performance of the client device:
at least one application,
at least one software patch,
at least one software update,
at least one operating system update,
at least one firmware update, or
at least one hardware update that is associated with the files and that is configured to improve operating performance of the client device; and
is based at least in part on:
the pattern of files associated with the client device or the series of files associated with the client device,
the performance information, and
an inference from a probability distribution over states in accordance with a classification scheme that maps an input attribute vector associated with an input to a confidence that the input belongs to a class,
the input relating to at least one of the pattern of files associated with the client device, the series of files associated with the client device, or the performance information,
the class corresponding to the configuration information.

18. The non-transitory computer-readable storage medium of claim 17, wherein the contextual information includes knowledge about a spike in network queries associated with at least one of at least one hardware issue or at least one software issue; and
wherein the operations comprise:
inferring a relationship between the knowledge about the spike in the network queries and the performance information; and
in response to the inferred relationship between the knowledge about the spike in the network queries and the performance information, providing, to the client device, the configuration information further based at least in part on the knowledge about the spike in the network queries.

19. The non-transitory computer-readable storage medium of claim 17, wherein the contextual information includes knowledge about a spike in messages associated with at least one of at least one hardware issue or at least one software issue; and
wherein the operations comprise:
inferring a relationship between the knowledge about the spike in the messages and the performance information; and
in response to the inferred relationship between the knowledge about the spike in the messages and the performance information, providing, to the client device, the configuration information further based at least in part on the knowledge about the spike in the messages.

20. The non-transitory computer-readable storage medium of claim 17, wherein the operations comprise:
receiving information associated with at least one social network query performed by at least one third party about at least one of at least one hardware issue or at least one software issue associated with at least one of the contextual information or the performance information;
inferring a relationship between the performance information and the at least one of the at least one hardware issue or the at least one software issue that the at least one social network query is about to obtain correlation information; and
providing, to the client device, the configuration information based at least in part on the correlation information.

\* \* \* \* \*